United States Patent [19]
Kunze et al.

[11] Patent Number: 5,351,157
[45] Date of Patent: Sep. 27, 1994

[54] MAGNETIC-TAPE CASSETTE APPARATUS HAVING A HEAD SUPPORT ACTUATION MECHANISM WITH A SEGMENTED TOOTHED WHEEL

[75] Inventors: Norbert Kunze, Ehringshausen; Georg Weber, Lohra-Weipoltshausen, both of Fed. Rep. of Germany

[73] Assignee: U.S. Philips Corporation, New York, N.Y.

[21] Appl. No.: 941,477

[22] Filed: Sep. 8, 1992

[30] Foreign Application Priority Data

Sep. 13, 1991 [DE] Fed. Rep. of Germany ....... 4130404

[51] Int. Cl.⁵ .................. G11B 5/54; G11B 15/10; G11B 15/24
[52] U.S. Cl. ................... 360/105; 360/96.1
[58] Field of Search ................. 242/197–201; 360/105, 137, 96.1–96.3

[56] References Cited

U.S. PATENT DOCUMENTS

| | | | |
|---|---|---|---|
| 3,976,263 | 8/1976 | Suzuki | 242/201 |
| 4,167,764 | 9/1979 | Hanajima et al. | 360/105 |
| 4,313,142 | 1/1982 | Uchida | 360/105 |
| 4,507,694 | 3/1985 | Hosono et al. | 360/105 |
| 4,656,552 | 4/1987 | Takahashi et al. | 360/105 |
| 4,896,234 | 1/1990 | Watanabe et al. | 360/137 |
| 4,922,358 | 5/1990 | Komatsu | 360/105 |
| 4,924,336 | 5/1990 | Klos-Hein et al. | 360/105 |
| 5,130,872 | 7/1992 | Ohashi et al. | 360/105 |
| 5,198,943 | 3/1993 | Kunze et al. | 360/96.3 |

FOREIGN PATENT DOCUMENTS

| | | |
|---|---|---|
| 0432816 | 6/1991 | European Pat. Off. |
| 3719890 | 11/1988 | Fed. Rep. of Germany |
| 8915526 | 12/1990 | Fed. Rep. of Germany |

*Primary Examiner*—Stuart S. Levy
*Assistant Examiner*—Brian E. Miller
*Attorney, Agent, or Firm*—Brian J. Wieghaus

[57] ABSTRACT

A magnetic-tape-cassette apparatus includes a deck, a reel-drive mechanism forming part of the deck, and a head support which carries a magnetic head and is movable between a play position, in which the head can be applied to a magnetic tape accommodated in a magnetic-tape cassette, and an eject position. The head support is spring-loaded towards the eject position and is movable towards the play position by a traction mechanism. A drive wheel of the traction mechanism is rotatable by a drive device of the deck. The traction mechanism further includes a segmental toothed wheel which has a toothless portion and which can be driven by the drive wheel of the reel-drive mechanism, the toothless portion facing the drive wheel in the play and the eject position of the head support through the action of a latching device. The segmental toothed wheel further includes a wholly toothed segment which meshes with a traction wheel having a pin which can act upon the head support in such a manner that it either presses said support into the play position or blocks the rotation of the traction wheel in a position in which the toothless portion faces the drive wheel and is consequently not in mesh with said drive wheel.

11 Claims, 4 Drawing Sheets

MAGNETIC-TAPE CASSETTE APPARATUS HAVING A HEAD SUPPORT ACTUATION MECHANISM WITH A SEGMENTED TOOTHED WHEEL

CROSS-REFERENCE TO RELATED APPLICATION

The application relates to U.S. application Ser. No. 07,941,465 filed concurrently herewith which discloses and claims a deck from a magnetic tape player which switches over from one tape direction to the other by means of only rotary or pivotal parts and to U.S. application Ser. No. 07,941,592 which disclose and claims a magnetic tape cassette apparatus with a simplified mechanical mechanism for switching over to the fastfowards mode, also filled concurrently herewith.

The invention relates to a magnetic-tape-cassette apparatus comprising a deck, a reel-drive mechanism forming part of the deck, and a head support by means of which a sound head is movable between a play position, in which the sound head can be applied to a magnetic tape accommodated in a magnetic-tape cassette, and an eject position, the head support, which is spring-loaded towards the eject position, being movable towards the play position by means of a traction mechanism, and a drive wheel of the traction mechanism being rotatable by a drive means of the deck.

Such a magnetic-tape-cassette apparatus is known from DE 37 19 890 A1. At both axial ends the head support of said apparatus comprises limbs, one of which cooperates with a latching device for magnetically holding the head support in the play position. From the play position the head support can return to an eject position. The other limb cooperates with an actuating mechanism adapted to move the head support from the eject position to the play position. This mechanism comprises a servo rod, which can exert pressure on the free end of the other limb of the head support either directly or via an intermediate element, the head support being rotatably supported at one side. The servo rod, as it presses against the free end of the limb, moves the other limb of the head support towards the latching device.

In the magnetic-tape-cassette apparatus described in DE 37 19 890 A1 the tape-deck functions are controlled by a microprocessor via a servo mechanism. A deck for an apparatus which is thus equipped is only suitable for high-end apparatuses. Decks for lower categories of magnetic-rope-cassette apparatuses operate purely mechanically and the tape-deck functions are controlled mechanically by push-button rods which can be actuated from the exterior of the apparatus.

U.S. Pat. No. 3,976,263 describes a head-support actuation system in which a head support is movable into a play position by a sliding plate with the aid of a drive wheel which can be driven by a toothed wheel of a capstan. The sliding plate can be moved when a starting plate allows the drive wheel to rotate and the head-mounting plate is coupled to the sliding plate. For compact apparatuses, such as car radios, this requires too many comparatively large pans.

SUMMARY OF THE INVENTION

It is an object of the invention to provide a magnetic-tape-cassette apparatus of the type defined in the opening paragraph, in which the head-mounting plate can be moved to the play position in a mechanically simple way by simple and compact mechanical means.

According to the invention this object is achieved in that the traction mechanism comprises a segmental toothed wheel which has a toothless portion and which can be driven by the drive wheel of the reel-drive mechanism, the toothless portion facing the drive wheel in the play and the eject position of the head support through the action of latching means, the segmental toothed wheel further comprises a wholly toothed segment which meshes with a traction wheel having a pin which can act upon the head support in such a manner that it either presses said support into the play position or blocks the rotation of the motion wheel in a position in which the toothless portion faces the drive wheel and is consequently not in mesh with said drive wheel.

The wheels by means of which the movement into the play position is effected are very suitable for being formed directly on the chassis plate of the deck as outsert-moulding parts. This is an injection-moulding or moulding technique by which the plastic pans are formed on a metal base in a single operation. In a subsequent process, for example as described in EP 392,600 A2, the wheels formed on the chassis plate are treated so as to make them rotatable. The functional pans only comprise the two wheels, which cooperate with a motion spring and a head-support spring which urges the head support backward. Thus, the construction does not require much space.

In a further embodiment of the invention there is provided a traction-wheel spring which tends to bring the segmental toothed wheel into mesh with the toothed drive wheel of the reel-drive mechanism, meshing being prevented only by the latching means. The traction spring is prevented from bringing the segmental toothed wheel into mesh with the toothed wheel of the reel-drive mechanism by the latching means only.

In another embodiment of the invention, a latching means of the traction wheel is constituted by a run-out latch having a latching nose which is in engagement with the traction wheel when the eject rod has moved out of the play position. This latching means serves both for preventing the traction mechanism from inadvertently moving the head support out of the eject position and for preventing the motor from running out after the head support has been moved to the eject position and the motor has subsequently been switched off.

In still another embodiment of the invention, the traction wheel is also latched by means of a stop edge of the head support, against which the pin of the traction wheel can abut when the head support is in the play position. This latching means ensures that the traction mechanism cannot rotate as long as the head support is in the play position.

In yet a further embodiment of the invention, there is provided a traction slide which is arranged on the head support so as to be movable in the direction of movement of said support and v/a which slide the head support can be moved into the play position by means of the traction wheel. This traction slide constitutes an intermediate element between the traction mechanism and the head support. This slide ensures that the head support is held very effectively in the play position.

In a further embodiment of the invention, the head support is urged into the play position by means of a head-support spring, which acts upon the head support via the traction slide. Thus, the head-support spring acts upon the head support via the traction slide.

In still a further embodiment of the invention, the head-support spring is constructed as a leg spring having a first leg, which urges the head support towards the play position, and a second leg, which urges the head support towards the eject position. Such a leg spring gently yet effectively holds the head support in its play position.

In a further embodiment of the invention, the free end of the first leg of the head-support spring is adapted to cooperate with the outwardly moved eject rod in such a manner that the first leg latches the head support in the play position and latching can be cancelled by moving the eject rod inward to eject the cassette. As long as the eject rod is in the outward position it is thus ensured that the head support is held in the play position.

In yet a further embodiment of the invention, the head-support spring is mounted on the head support by means of a mounting portion provided between the first leg and the second leg, and the second leg locally acts upon the head support in such a manner that a movement of the first leg towards the play position of the head support causes the head support to be moved, because the resulting torques on the head-support spring act upon the head support, and the extension of the second leg, which acts upon the chassis of the deck, is isolated from the first leg with respect to forces, thereby enabling the second leg to perform a further spring function (for example the return of the head support from the eject position into the play position, which is at another force level than the first function).

BRIEF DESCRIPTION OF THE DRAWINGS

The invention will now be described in more detail with reference to the drawings. In the drawings.

DESCRIPTION OF THE PREFERRED EMBODIMENTS

Figure 1:
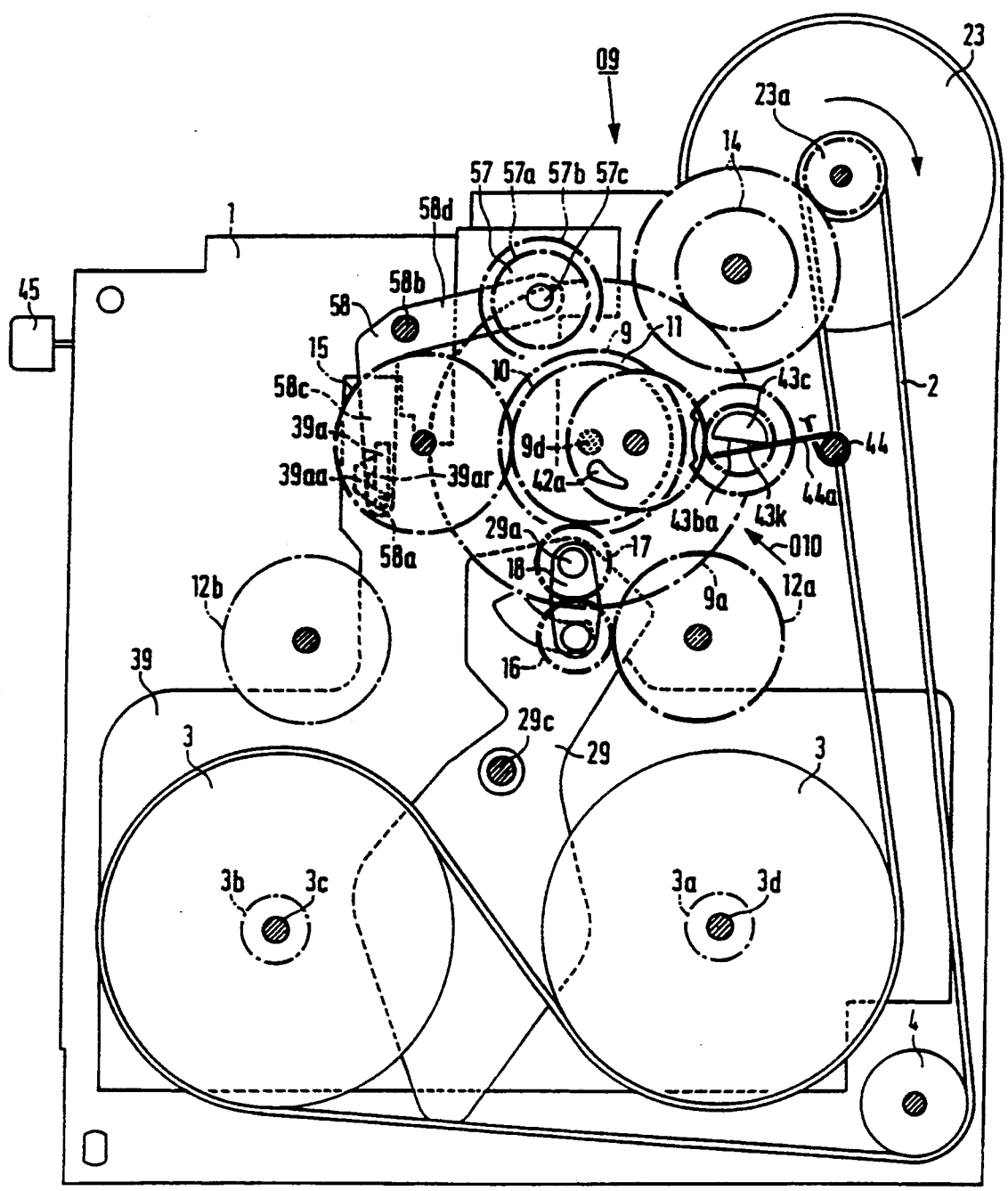
FIG. 1 shows the deck of a magnetic-tape-cassette apparatus, in particular for use in a car radio comprising a reel-drive mechanism, a head support and a traction mechanism for moving the head support into its play position.

FIG. 1 shows the deck of a magnetic-tape-cassette apparatus comprising a chassis 1, a reel-drive mechanism 09 and a traction mechanism 010 of the deck. By means of a belt 2 a motor 23 drives flywheels 3 for the capstan 3c for reverse play (REV) and the capstan 3d for forward play (NOR) in opposite directions of rotation. The capstans 3c, 3d have teeth 3a and 3b. The belt 2 is passed over a guide roller 4.

Figure 2:
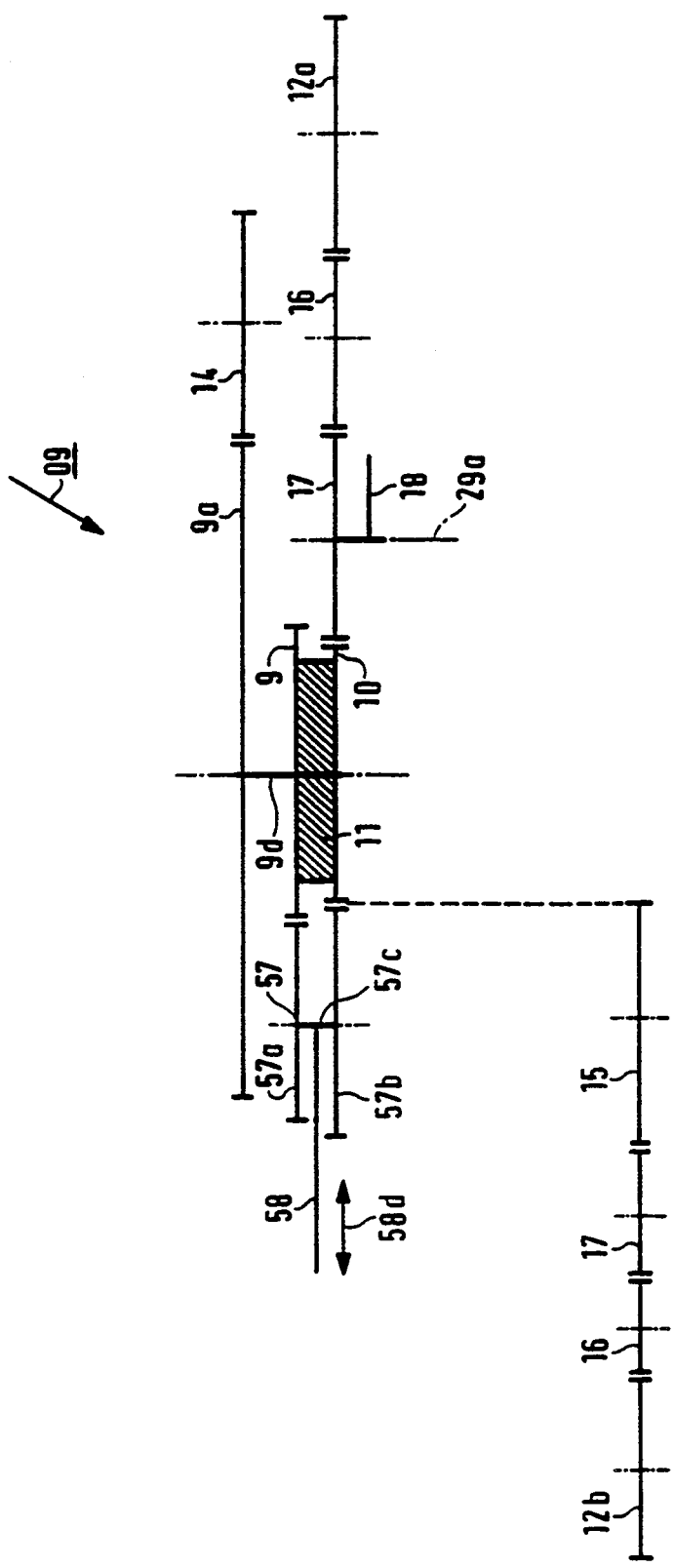
FIG. 2 is a sectional view of the reel-drive mechanism of the deck shown in FIG. 1.

The reel-drive mechanism 09, which is also driven by the motor 23 and is shown in sectional view in FIG. 2, serves to drive the forward reel disc 12a for forward play (NOR) and the reverse reel disc 12b for reverse play (REV). The motor 23 can rotate in only one direction. With its shaft 23a the motor 23 drives a play coupling via an intermediate drive wheel 14, which coupling has a primary coupling wheel 9 with a toothed drive ring 9a, which constantly rotates about a spindle 9d as long as the motor shaft 23a rotates. The primary coupling wheel 9 drives a secondary coupling wheel 10, which is concentric therewith, via a friction coupling 11. The friction coupling 11 may be a coupling spring, a felt coupling or a electromechanical coupling.

The secondary coupling wheel 10 is in mesh with an intermediate wheel 17, which is rotatable about a spindle 29a of a switching lever 29. The switching lever 29, which can be set to and held in an end position for forward operation (NOR) and an end position for reverse operation (REV) by spring load, is shown in the NOR position in FIG. 1, in which position it is urged clockwise. The toothed wheel 17 meshes with a toothed wheel 16, which in the situation illustrated in FIGS. 1 and 2 is in mesh with the NOR reel disc 12a.

The meshing forces act on the individual toothed wheels in such a way that the pair NOR reel disc 12a/pivotal wheel 16 is engaging and the pair secondary coupling wheel 10/intermediate wheel 1.7 is disengaging. In the NOR position shown in FIG. 1 the switching lever 29 is urged clockwise by a switching-lever spring 66, not shown. The spring load is such that the switching lever 29 is urged to the fight, i.e. clockwise, towards the NOR reel disc 12a against the meshing forces.

The reel-drive mechanism 09 comprises a double toothed bypass wheel 57, whose spindle 57c is arranged on a two-arm bypass-wheel lever 58, which is pivotable about a pivot 58b. As is indicated by a double arrow 58d in FIG. 2 the bypass wheel 57 can be engaged with or disengaged from the primary coupling wheel 9 and the secondary coupling wheel 10 in such a way that the coupling 11 is bypassed in the case of engagement and the coupling is operative in the case of disengagement. By means of this bypass wheel 57 the NOR and REV reel discs 12a, 12b can be switched to rapid rotation for the purpose of fast winding. In order to obtain the higher fast-winding speed the transmission ratio has been selected in a such a way that the number of teeth of the primary coupling wheel 9 is larger than the number of teeth of the secondary coupling wheel 10, and that the number of teeth of the bypass wheel 57a meshing with the toothed wheel 9 is smaller than the number of teeth of the bypass wheel 57b meshing with the secondary coupling wheel 10.

The reel-drive mechanism 09 further comprises a reversing wheel 15, which is constantly in mesh with the secondary coupling wheel 10. In the case of reverse operation this reversing wheel can drive the REV reel disc 12b via the intermediate wheel 17 and the pivotal wheel 16.

One arm of the two-arm bypass lever 58 carries the bypass wheel 57 and the other arm 58c of the bypass lever 58 carries an actuating pin 58a, which engages a guide profile 39a of the head support 39. This guide profile 39a is constructed as a continuous guide path comprising an upwardly inclined left-hand path section 39aa, which bends to the left in the drawing, and a rectilinear flat return path section 39ar, the ends of the path sections being interconnected. The actuating pin 58 a can move around in the guide profile 39a. When the head support 39 moves from the play position into the eject position the actuating pin 58a will pass through the left-hand path section 39aa, causing the actuating pin 58a to be moved to the left and the bypass wheel 57 to be pivoted against the primary and the secondary coupling wheel 9 and 10. When the head support remains in this position the bypass wheel 57 provides a bypass connection between the primary and the secondary coupling wheel 9, 10. Since the transmission from the primary coupling wheel 9 to the secondary coupling wheel 10 v/a the bypass wheel has been selected in such a way that the secondary coupling wheel 10 can rotate with a higher speed this drive configuration enables a rapid rotation of the reel discs 12a, 12b to be achieved. This rapid rotation can be fast forward winding (FFW) or fast reverse winding (FRW).

The traction mechanism 010 comprises a traction wheel 42 which is supported on the chassis 1 and which meshes with a segmental toothed wheel 43. The segmental toothed wheel 43 is a double wheel comprising a large toothed segment 43a having a toothless portion 43L. This large toothed segment 43a can be brought into mesh with the primary coupling wheel 9. A small toothed segment 43b can drive the traction wheel 42. The small toothed segment 43b carries a semicylindrical portion 43c having a locating surface 43ha. A first leg 44a of a traction-wheel spring 44 acts upon a surface 43k of the semicylindrical portion 43c to urge the segmental toothed wheel 43 anti-clockwise.

Head Support with Traction Mechanism in the Eject Position

Figure 3:
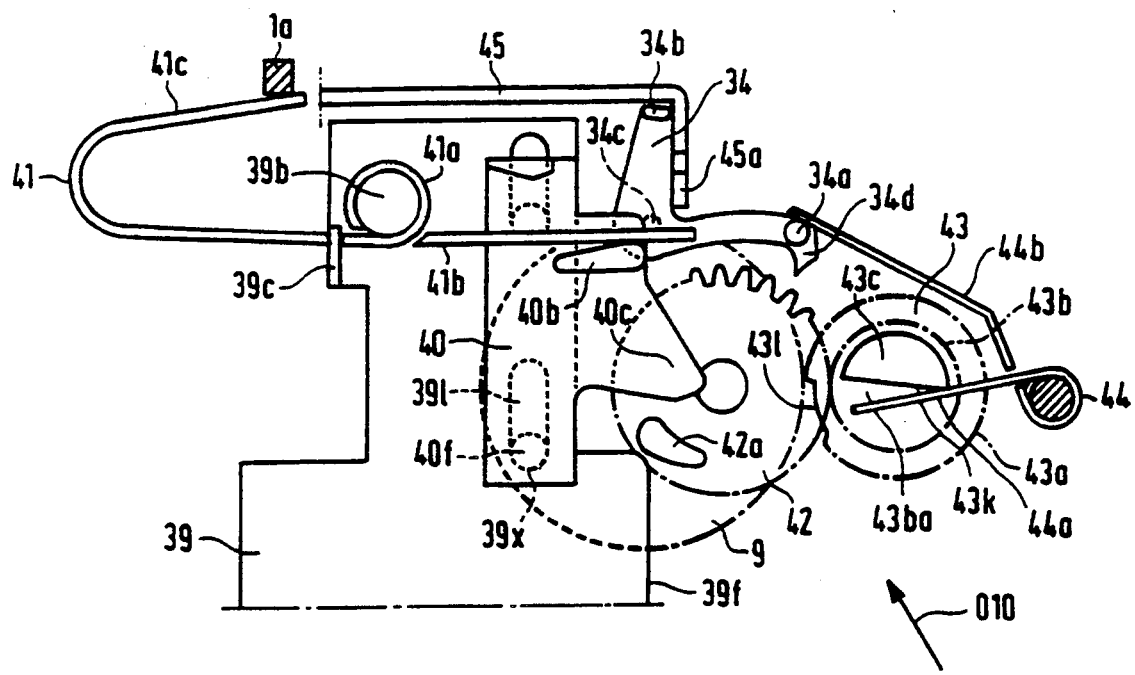
FIG. 3 shows the head support and the traction mechanism when the head support is in the eject position.

FIG. 3 shows the part of the head support 39 which is relevant for the head-support movement and which has been provided with a traction slide 40. A head-support spring 41 urges the head support into the play position. There has also been provided a run-out catch 34. The eject rod 45 cooperates with the head support in a manner to be described hereinafter.

In the situation illustrated in FIG. 3 the head support 39 has returned into the eject position, said situation being a situation briefly before the movement of the head support 39 into the play position. The eject rod 45 has moved out and the motor 23 has just been started.

The traction slide 40 is arranged on the head support 39 so as to be movable in the direction of movement of the head support, for which purpose a pin 40f engages a slot 39L in the head support 39. The coiled portion 41a of the pretensioned head-support spring 41 is fitted around a spring post 39b of the head support 39. A first leg 41b of the spring 41 lies against a pin 40b of the traction slide 40 and presses the slide downward against a stop, not shown, on the head support 39. A second leg 41c of the spring 41 initially lies against a spring hook 39c of the head support. Thus the torque of the head-support spring 41 applied by the first leg 41b acts upon the head support 39 itself via the post 39b, and a movement of the first leg 41b (to the top in the drawing) results in a movement of the head support 39 into the play position. The head support 39 is loaded in the outward direction (to the bottom in the drawing) via the free end of the second leg 41c, which bears against the pin 1a on the chassis. The headsupport spring 41 then acts upon the head support 39 with its second leg 41c in such a way that a movement of the first leg 41b in the direction of movement of the head support 39 causes the head support to be moved, because the resulting torques of the head-support spring 41 act upon the head support 39. Thus, with respect to forces, the extension of the second leg 41c is isolated from the first leg 41b. This enables the second leg 41c to perform a further spring function at another force level, for example the return of the head support 39 from the eject position into the play position. The technical advantage then resides in the combination of the springs for the return of the head support 39 into the play position and the actuation of the pull-in mechanism.

FIG. 3 shows the traction mechanism 010 briefly before the movement of the head support 39 into the play position. This situation is obtained because the eject rod 45 has just moved outward. During this movement the eject rod 45 has pivotett a run-out latch 34, which is pivotable about a fixed pivot on the chassis, in the anticlockwise direction against the action of the traction-wheel spring 44 in that it has moved a push-button pin 34b in the outward direction to the left. A latching nose 34d of the run-out latch is then disengaged from a tooth gap 42b of the traction wheel 42. The traction wheel can now rotate. The rotary drive is provided by the spring 44 via the leg 44a, which rotates the segmental toothed wheel 43 anti-clockwise.

Figure 4:
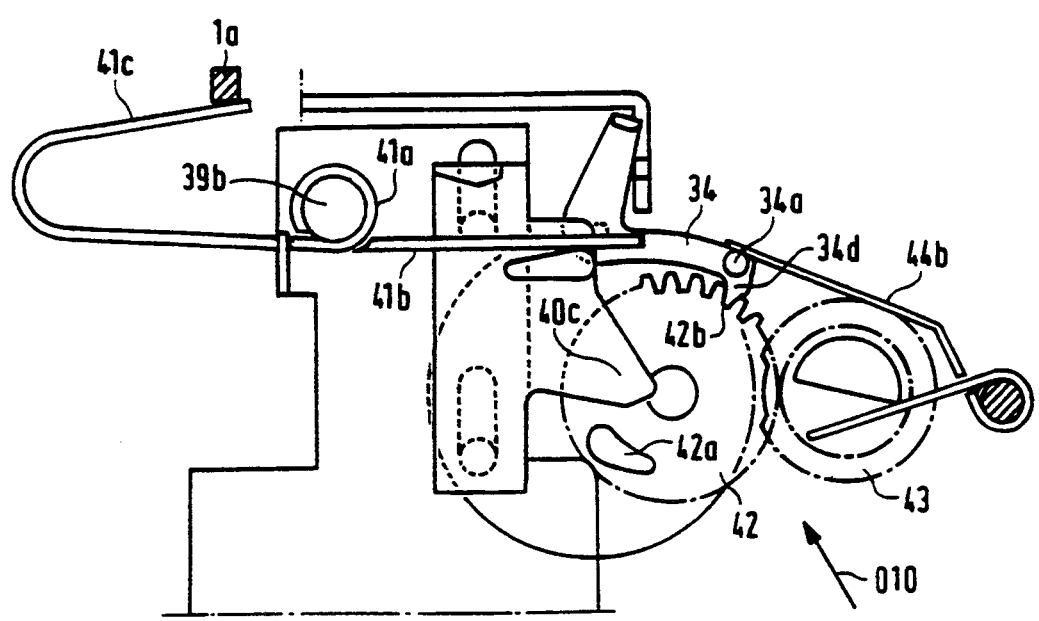
FIG. 4 shows how the traction mechanism is latched when the head support is in the eject position.

FIG. 4 shows the position of the traction mechanism 010 before the outward movement of the eject rod 45. The eject rod has been pressed to the fight to eject a cassette. The leg 44b of the traction-wheel spring 44 presses against the pin 34a of the run-out latch 34 and pivots this latch clockwise, thereby enabling its latching nose 34d to engage the tooth gap 42b. The pivotal movement of the run-out latch 34 is possible because the pressure of the eject rod 45 on the push-button pin 34b of the runout latch ceases during the inward movement. Thus, the traction wheel 42 is locked against rotation. At this instant the motor 23 has stopped or runs out.

This blocking of the traction wheel 42 ensures that immediately after the disengagement of the head support 39 no new movement of the head support is possible if the motor runs out as a result of its inertia although it has been de-energized. The traction wheel 42 cannot rotate until the eject rod moves out again when a cassette is inserted or to stop Manual Standby, because the run-out latch 34 is then pivoted anti-clockwise by the eject rod 45 on the push-button pin 34b and the latching nose 34d is thus withdrawn from the tooth gap 42b.

If the eject rod 45 moves outward upon insertion of a cassette and the traction wheel 42 is no longer blocked because the run-out latch is pivoted anti-clockwise, the traction-wheel spring 44 can rotate the segmental toothed wheel 43 anticlockwise by means of its leg 44a when the motor 23 is started. The teeth of the segmental toothed wheel 43 then mesh with the teeth of the primary coupling wheel 9. The primary coupling wheel 9 now rotates the segmental toothed wheel 43 further and transmits the rotation to the traction wheel 42. The pin 42a abuts against a limb 40c of the traction slide 40 and moves the traction slide 40 towards the play position.

As a result of the coupling between the traction slide 40 and the head-support spring 41 via the pin 40b of the traction slide 40 the head support 39 is moved up to stops, not shown, on the chassis. These stops define the play position of the head support 39. As the rotation of the traction wheel 42 proceeds the traction slide 40 is lifted off its stop 39x on the head support 39 and holds the head support 39 against stops on the chassis via the head-support spring leg 41b.

Head Support with Traction Mechanism in the Play Position

Figure 5:
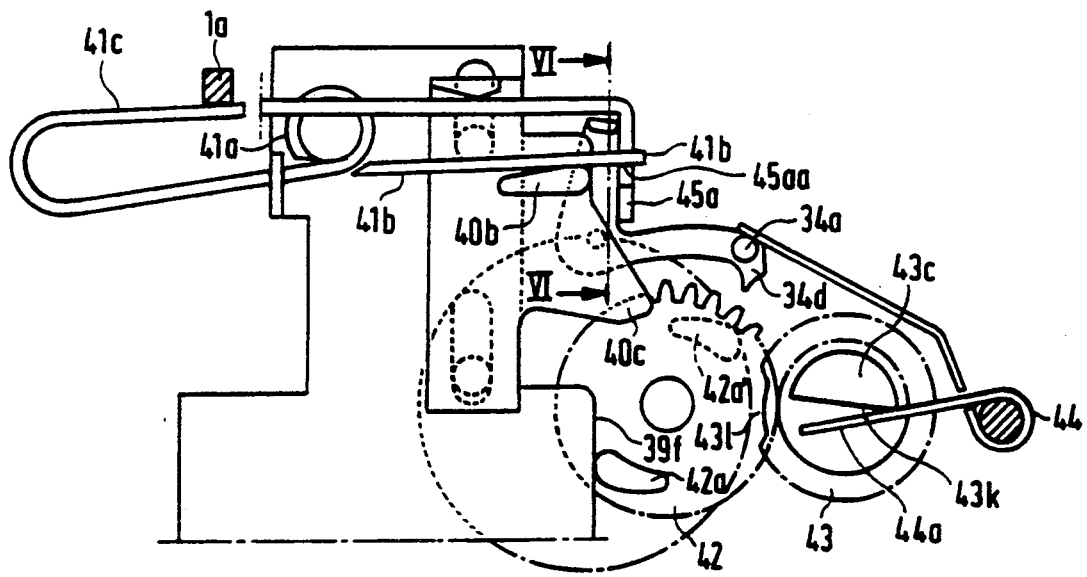
FIG. 5 shows the head support latched in the play position.
Figure 6:
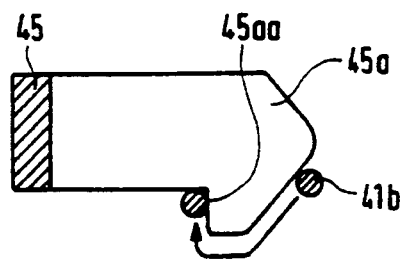
FIG. 6 is a side view of a pan of the eject rod cooperating with a headsupport spring shown in a sectional view taken on the line VI—VI in FIG. 5.

FIG. 5 shows the head support 39 in the play position against fixed stops, not shown, on the chassis. The first leg 41b of the head-support spring 41 has engaged underneath a latching hook 45a of the eject rod 45 and behind a latching nose 45aa thereof (FIG. 6). The head support 39 is consequently latched.

The traction wheel 42 continues to rotate. By providing a transmission ration of 1:2 between the segmental-wheel teeth 43a and the traction wheel 42 the segmental toothed wheel 43 is initially rotated through 360° until its toothless portion 43L is at the location of the primary coupling wheel 9. The traction wheel 42 is then oriented in such a way that its pin 42a is in position 42a'. However, in this position the first leg 44a of the traction-wheel spring 44 acts upon the surface 43k of the semicylindrical portion 43c exactly as shown in the drawing. This means that the segmental toothed wheel 43 is now subjected to an anti-clockwise torque, so that the toothless portion 43L is traversed. Thus, the segmental toothed wheel 43 and the traction wheel 42 continue to rotate until the pin 42a of the traction wheel 42 abuts against the stop 39f of the head support 39. In this position the segmental toothed wheel 43 is again disengaged from the primary coupling wheel 9.

If the user moves the eject rod 45 inward (to the fight) for the eject or the Manual Standby function the latching hook 45a is also moved to the fight. The first leg 41b of the head-support spring 41 is now liberated. The motor 34 stops and the head support 39 is moved from the play position into the Standby or eject position. The stop 39f on the head support releases the pin 42a of the traction wheel 42. However, this wheel cannot yet be rotated by the force of the traction spring 44 because during the inward movement of the eject rod 45 the push-button pin 43b of the run-out latch 34 has also moved to the fight and thereby pivots the latch 34 clockwise by means of the spring leg 44b. The latching nose 34d of the run-out latch has engaged the tooth gap 42b, thereby blocking a rotation of the traction wheel 42.

We claim:

1. A magnetic tape cassette apparatus, comprising:
   a) a head support which is moveable between a play position and an eject position, said head support including a blocking face;
   b) biasing means for biasing said head support towards said eject position;
   c) a toothed rotatable drive wheel;
   d) a segmental wheel which includes (i) a first, segmented wheel portion having a toothed portion driveable by said drive wheel and a toothless portion, said segmental wheel not being driveable by said drive wheel when the toothless portion faces said drive wheel, and (ii) a second wheel portion;
   e) a traction wheel driveable by said second wheel portion of said segmental wheel and including a pin engageable with said head support;
   f) latching means for latching said traction wheel with said toothless portion of said segmental wheel facing said drive wheel in the play and eject positions of said head support and for selectively unlatching said traction wheel; and
   g) a spring engaging said segmental wheel for rotating said toothed portion of said segmented wheel portion into engagement with said drive wheel when said segmental wheel is unlatched by said latching means;
   said traction wheel and head support being arranged such that, when said traction wheel is unlatched by said latching means and said toothed portion of said first, segmented portion is driven by said drive wheel, said pin engages said head support and moves said head support from said eject position into said play position and such that, when said head support reaches said play position, said pin engages said blocking face of said head support whereupon said traction wheel is blocked against rotation, and
   said traction wheel and said second wheel portion of said segmental wheel having a drive ratio selected such that with said pin engaged against said blocking face of said head support, said toothless portion of said first wheel portion of said segmental wheel faces said drive wheel and said segmental wheel and traction wheel are not driven by said drive wheel.

2. A magnetic-tape-cassette apparatus as claimed in claim 1, further comprising an eject rod moveable between an eject and a play position, and wherein the latching means of the traction wheel comprises a runout latch having a latching nose which latches the traction wheel when the eject rod has moved out of the play position.

3. A magnetic-tape-cassette apparatus as claimed in claim 2, characterized in that said biasing means comprises a head-support spring which is constructed as a leg spring having a first leg, which urges the head support towards the play position, and a second leg, which urges the head support towards the eject position.

4. A magnetic-tape-cassette apparatus as claimed in claim 1, further comprising a traction slide which is arranged on the head support so as to be movable in the direction of movement of said support and via which slide the head support can be moved into the play position by means of the traction wheel.

5. A magnetic-tape-cassette apparatus as claimed in 4, wherein said biasing means comprises a head-support spring for urging the head support into the play position, the head-support spring acting upon the head support via the traction slide.

6. A magnetic-tape-cassette apparatus as claimed in claim 5, characterized in that the head-support spring is constructed as a leg spring having a first leg, which urges the head support towards the play position, and a second leg, which urges the head support towards the eject position.

7. A magnetic-tape-cassette apparatus as claimed in claim 6 characterized in that the first leg of the head-support spring has a free end which cooperates with the eject rod in the play position thereof in such a manner that the first leg latches the head support in the play position and latching of the head support can be cancelled by moving the eject rod to the eject position thereof.

8. A magnetic-tape-cassette apparatus as claimed in claim 7, further comprising a chassis carrying said head support, and wherein the head-support spring includes a mounting portion mounted on the head support, the mounting portion being situated between the first leg and the second leg, and the second leg acts upon the chassis and locally acts upon the head support in such a manner that a movement of the first leg towards the play position of the head support causes the head support to be moved, because the resulting torques on the head-support spring act upon the head support, and the extension of the second leg, which acts upon the chassis, is isolated from the first leg with respect to forces, thereby enabling the second leg to perform a further spring function.

9. A magnetic-tape-cassette apparatus as claimed in claim 1, characterized in that said biasing means comprises a head-support spring is constructed as a leg spring having a first leg, which urges the head support towards the play position, and a second leg, which urges the head support towards the eject position.

10. A magnetic-tape-cassette apparatus as claimed in claim 9, further comprising an eject rod moveable between an eject and a play position, and wherein the first leg of the head-support spring has a free end which cooperates with the eject rod in the play position thereof in such a manner that the first leg latches the head support in the play position and latching of the head support can be cancelled by moving the eject rod to the eject position thereof.

11. A magnetic-tape-cassette apparatus as claimed in claim 9, further comprising a chassis carrying said head support and wherein the head-support spring includes a mounting portion mounted on the head support, the mounting portion being situated between the first leg and the second leg, and the second leg acts upon the chassis and locally acts upon the head support in such a manner that a movement of the first leg towards the play position of the head support causes the head support to be moved, because the resulting torques on the head-support spring act upon the head support, and the extension of the second leg, which acts upon the chassis, is isolated from the first leg with respect to forces, thereby enabling the second leg to perform a further spring function.

* * * * *